US006095489A

United States Patent [19]

[11] Patent Number: 6,095,489
[45] Date of Patent: Aug. 1, 2000

Kaneko et al.

[54] DOUBLE- OR SINGLE-SOLENOID TYPE SELECTOR VALVE ENCAPSULATED IN RESIN

[75] Inventors: Ryushiro Kaneko; Makoto Ishikawa; Masaru Narita, all of Yawara-mura, Japan

[73] Assignee: SMC Corporation, Tokyo, Japan

[21] Appl. No.: 09/023,121

[22] Filed: Feb. 13, 1998

[30] Foreign Application Priority Data

Mar. 14, 1997 [JP] Japan .................................... 9-081981

[51] Int. Cl.[7] .................................................... F16K 31/02

[52] U.S. Cl. ......................................................... 251/129.15

[58] Field of Search ................ 251/129.15; 137/625.64, 137/884

[56] References Cited

U.S. PATENT DOCUMENTS

| | | | |
|---|---|---|---|
| 3,800,257 | 3/1974 | Schmitt | 335/259 |
| 5,538,220 | 7/1996 | LaMarca | 251/129.15 |
| 5,558,126 | 9/1996 | Hayashi et al. | 137/625.64 |
| 5,597,015 | 1/1997 | Asou et al. | 137/625.64 |

FOREIGN PATENT DOCUMENTS

| | | |
|---|---|---|
| 0 662 696 | 7/1995 | European Pat. Off. . |
| 0 664 402 | 7/1995 | European Pat. Off. . |
| 2 352 381 | 12/1977 | France . |
| 2532723 | 6/1996 | Japan . |

*Primary Examiner*—Kevin Shaver
*Assistant Examiner*—Eric Keasel
*Attorney, Agent, or Firm*—Oblon, Spivak, McClelland, Maier & Neustadt, P.C.

[57] ABSTRACT

Two coil assemblies 2*a* and 2*b* each having a coil 6 wound around a bobbin 5, a fixed and a movable iron cores 8 and 11 provided in a center hole 7 of the bobbin 5, and a pair of pin-like coil terminals 9*a* and 9*b* protruding from the end surface from the bobbin 5 are integrated into a single magnetic frame sized so as to accommodate two coil assemblies simultaneously, or a single coil assembly 2*a* and a dummy member 3 having essentially the same external shape and size as the coil assembly are integrated into the magnetic frame. These components are sealed and integrated into a synthetic resin 22.

5 Claims, 8 Drawing Sheets

DOUBLE- OR SINGLE-SOLENOID TYPE SELECTOR VALVE ENCAPSULATED IN RESIN

FIELD OF THE INVENTION

The present invention relates to a solenoid mounted and used in a solenoid-operated valve.

PRIOR ART

Solenoid-operated valves that switch a channel for an operating fluid such as compressed air include pilot solenoid-operated valves that use a solenoid-operated pilot valve to operate a transfer valve. Such pilot solenoid-operated valves are classified into a single pilot type with a single pilot valve, and a double pilot type with two pilot valves.

In a single-pilot solenoid-operated valve, a force effected by a spring or a pilot fluid is constantly applied to one end of a spool in a transfer valve, and a pilot valve supplies and ejects a pilot fluid to and from a piston at the other end of the spool in order to switch the spool. In a double-pilot solenoid-operated valve, two pilot valves alternately supply and eject a pilot fluid to and from pistons at both ends of a spool in order to switch the spool.

Since these single- and double-pilot solenoid-operated valves differ in terms of the number of pilot valves and the method for supplying a pilot fluid to the spool, they have different structures and essentially cannot share the same parts.

Nonetheless, using means for allowing one of the two pistons provided at the respective ends of the spool to be arbitrarily installed and removed or to change its size or for forcing the two pistons to have different pressure-receiving areas, the transfer valve can be used as both single and double pilot types. In this case, due to the difference in the number of pilot valves, their external shapes are different. Due to the use of a common transfer valve, however, many users need single- and double-pilot solenoid-operated valves that have the same external shapes.

To meet this need, JP2532723 proposes a single-pilot solenoid-operated valve having substantially the same external shape as a double-pilot solenoid-operated valve. In this valve, a single solenoid and a single dummy body with the same shape and size as the solenoid are integrally molded and mounted in the transfer valve. To configure this as a double-pilot solenoid valve, two integrally-molded solenoids are mounted in the transfer valve.

Due to the use of two complete molded solenoids that can operate separately, however, the double-pilot solenoid-operated valve use duplicate parts that could otherwise be shared by both solenoids, resulting in the inefficient use of parts. In addition, in both double- and single-pilot types, the two solenoids or the solenoid and dummy body must be coupled during molding using an exclusive holding member, thereby increasing the number of required parts, which complicates the structure and increases the cost of assembly.

DISCLOSURE OF THE INVENTION

It is an object of this invention to use a simple and economical method to configure both solenoids used for single- and double-pilot solenoid-operated valves so as that they have substantially the same external shape by allowing them to share common parts, enabling some of the parts to be used for multiple applications.

To achieve this object, this invention provides a solenoid for a solenoid-operated valve having a single magnetic frame sized so as to accommodate two coil assemblies simultaneously.

To configure as a double-pilot solenoid, the two coil assemblies are assembled into the magnetic frame and the magnetic frame, and two coil assemblies are then sealed and integrated into a synthetic resin using molds. The magnetic frame is not only shared by the two coil assemblies to form magnetic paths for them but also functions as a holder that holds the coil assemblies in such a way that they are coupled together.

Thus, this configuration eliminates the need to provide an individual magnetic frame for each coil assembly and to provide a separate holder.

To configure as a single-pilot solenoid, a single coil assembly and a single dummy member with the same external shape and size as the coil assembly are integrated into the magnetic frame. The coil assembly and dummy member are then sealed and integrated into a synthetic resin together with the magnetic frame. The magnetic frame also not only forms a magnetic path for the coil assembly but functions as a holder that holds the coil assembly and dummy member.

The coil assembly has a coil wound around a bobbin, one fixed and one movable iron core provided in a center hole of the bobbin, a pair of pin-like coil terminals protruding from the end surface of the bobbin.

According to a specific embodiment of this invention, a circuit board mounting stand of a synthetic resin is disposed on the outer surface of the magnetic frame, and a printed circuit board and a terminal housing having a plurality of power-receiving terminals are mounted on the circuit board mounting stand. The power reception terminal and coil terminal are connected via the printed circuit board, and the circuit board mounting stand, printed circuit board, and terminal housing are sealed and integrated into the mold resin together with the magnetic frame and coil assembly.

This configuration provides a safe and appropriately insulated solenoid.

According to this invention, the other end of the power reception terminal can protrude to the exterior of the solenoid in order to connect a lamp circuit board to the power-reception terminal.

According to a more specific embodiment of this invention, the magnetic frame consists of a first U-shaped member and a second member that connects both ends of the first member together. A plurality of positioning protrusions formed at the vertical ends of each coil assembly are engaged with a plurality of engaging portions formed in the first and second members to integrate the coil assembly and dummy member into the magnetic frame.

DETAILED DESCRIPTION

Figure 1:
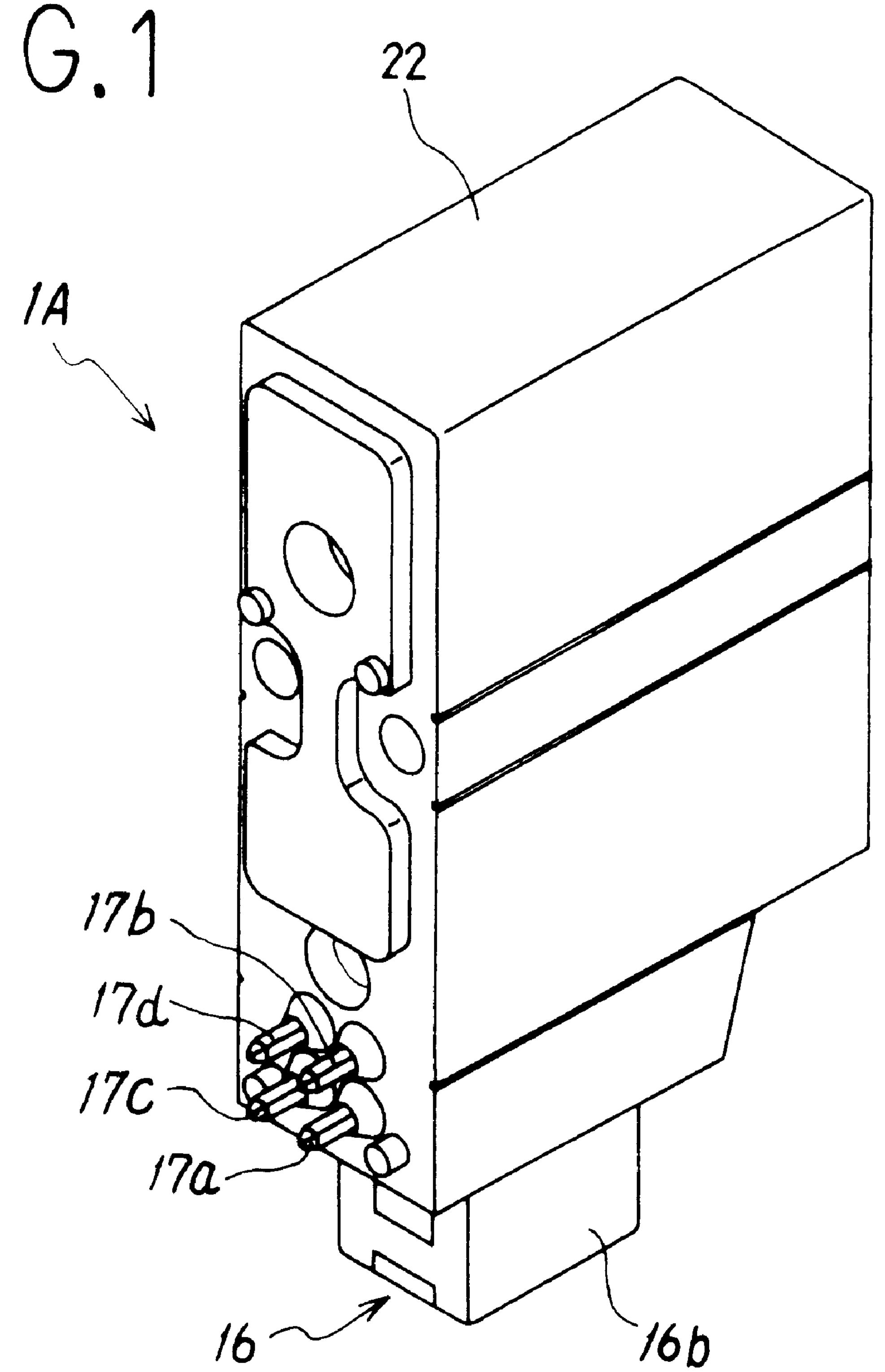
FIG. 1 is a perspective view showing a first embodiment of a solenoid according to this invention.
Figure 2:
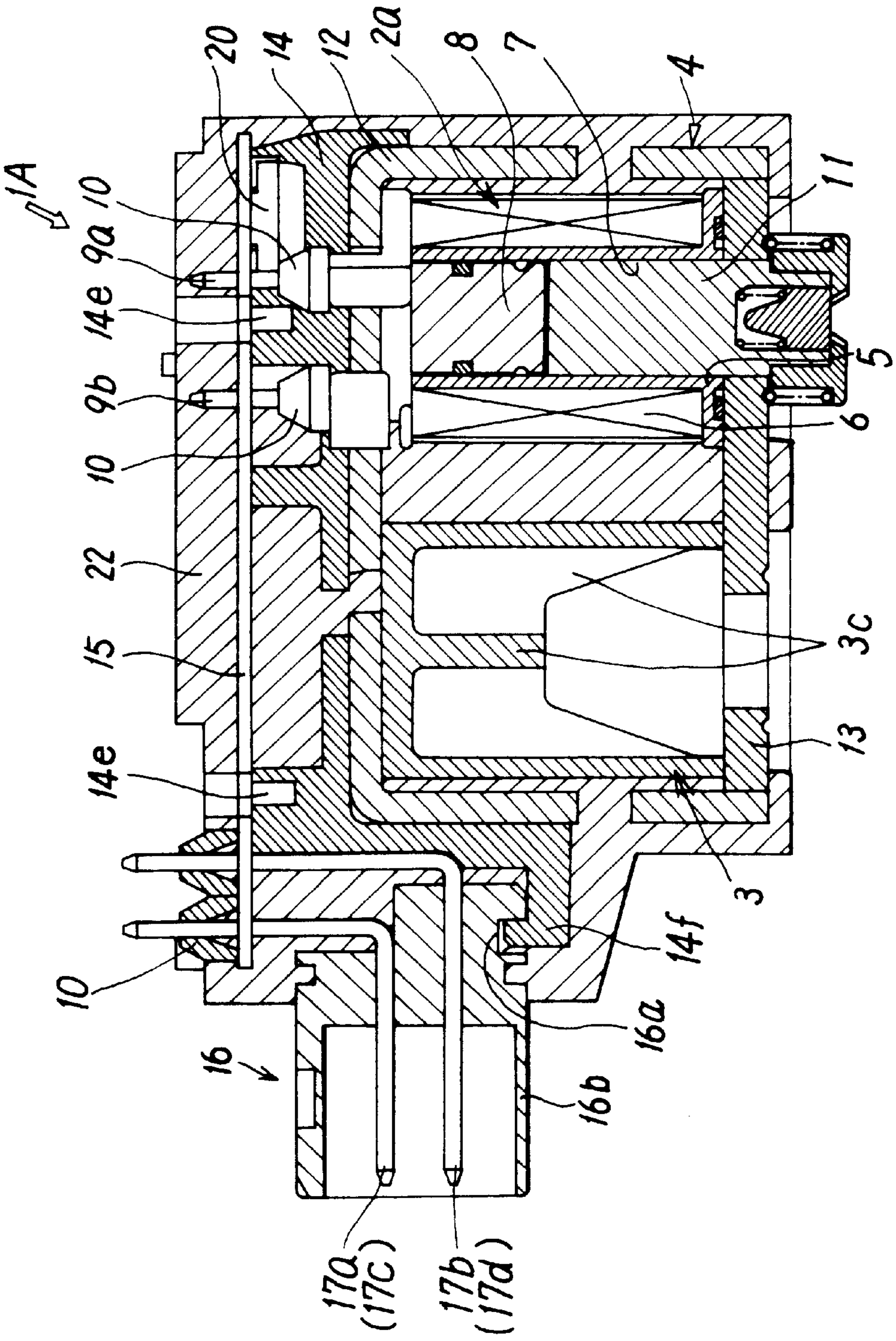
FIG. 2 is a cross sectional view of FIG. 1.
Figure 3:
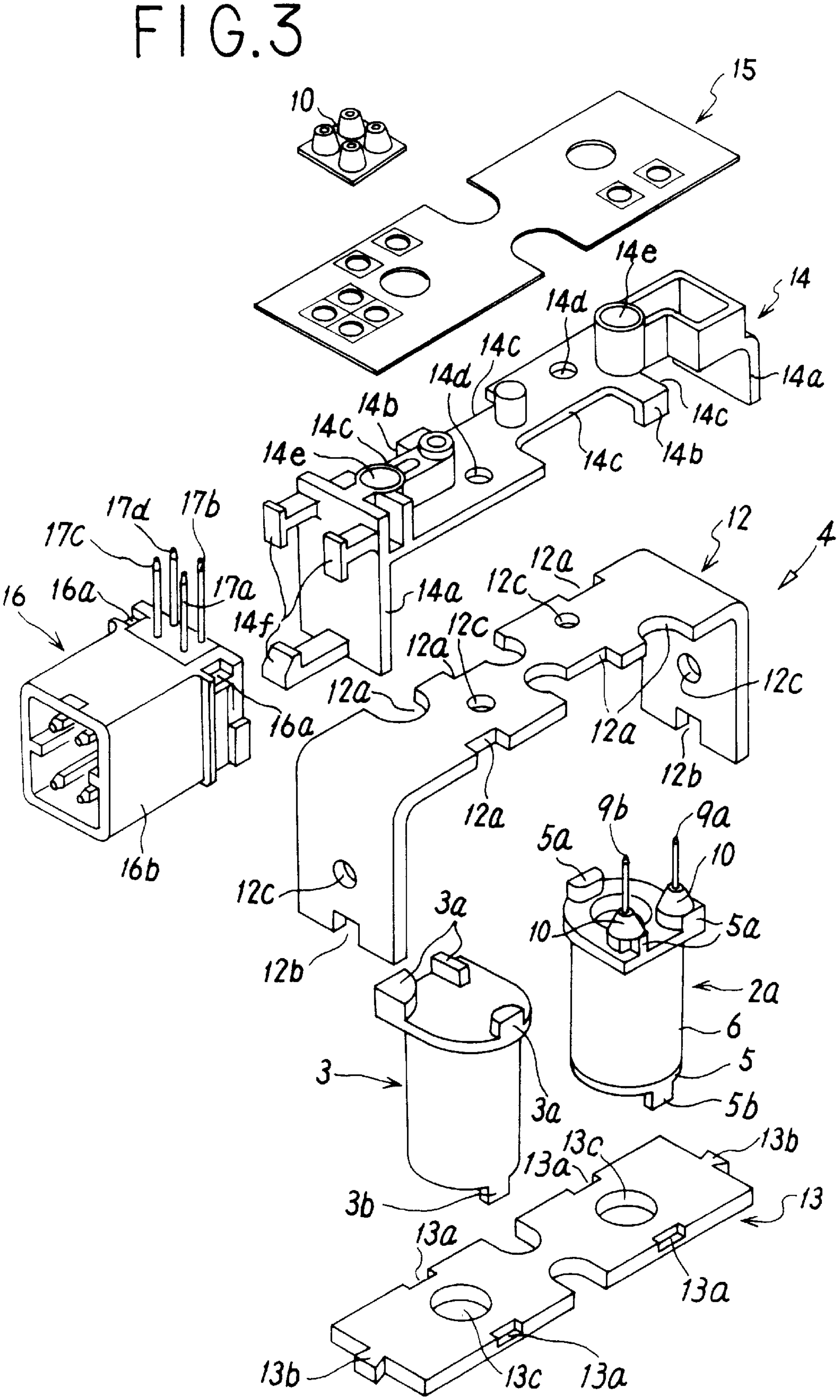
FIG. 3 is a perspective view showing the solenoid in FIG. 1 disassembled.

FIGS. 1 to 4 show a first embodiment of a solenoid according to this invention. A solenoid 1A is shown to be configured as a single-pilot type, but its external shape is substantially the same as that of the double-pilot type (see FIG. 5). The solenoid 1A comprises a single coil assembly 2*a* and a single dummy member 3 that are assembled and molded in a single magnetic frame 4 consisting of a magnetic substance so that they are sealed and integrated into a synthetic resin 22.

The coil assembly 2*a* comprises a bobbin 5 around which a coil 6 is wound, a fixed iron core 8 fitted at one end of a center hole 7 in the bobbin 5, a movable iron core 11 movably disposed at the other end of the center hole 7, and a pair of pin-like coil terminals 9*a*, 9*b* that protrude from one end surface of the bobbin 5.

Three positioning protrusions 5*a* are provided on a flange at one end of the bobbin 5 in such a way as to be located at the vertexes of a triangle, and two positioning protrusions 5*b* are provided on a flange at the other end of the bobbin in such a way as to be opposed to the protrusions 5*a*. In addition, a conical rubber cap 10 is fitted around the coil terminals 9*a* and 9*b*.

The dummy member 3, which is formed of an appropriate synthetic resin, is shaped like a cylinder that has substantially the same external shape and size as the coil assembly 2*a*. Three positioning protrusions 3*a* are provided at one axial end of the dummy member 3 in such a way as to be located at the vertexes of a triangle, and two positioning protrusions 3*b* are provided in such as a way as to be opposed to the protrusions 3*a*. In addition, a reinforcing rib 3*c* shaped like a cross is provided inside the dummy member 3.

The magnetic frame 4 consists of a first U-shaped member 12 and a second member 13 connecting both ends of the first member. Three engaging portions 12*a* that engage the three protrusions 5*a* and 3*a* formed at the upper ends of the coil assembly 2*a* and dummy member 3 are formed in the intermediate piece of the first member 12 at positions to which the coil assembly 2*a* and dummy member 3 are attached, and a plurality of inflow holes 12*c* that allow the synthetic resin to flow into the magnetic resin 4 during molding are also formed therein. Notches 12*b* to which the second member 13 is connected are formed at the respective ends of the first member 12.

Two through-holes 13*c*, 13*c* through which the movable iron core 11 protrudes are provided in the second member 13 at a position at which the coil assembly 2*a* and dummy member 3 are incorporated, and engaging portions 13*a* that engage the two positioning protrusions 5*b* and 3*b* at the lower end of the coil assembly 2*a* and dummy member 3 are formed at both axial ends of the second member 13. In addition, protrusions 13*b*, 13*b* that engage the notches 12*b*, 12*b* are formed at both longitudinal ends of the second member.

A circuit-board mounting stand 14 formed of a synthetic resin is disposed on the outer surface of the magnetic frame 4 from which the coil terminals 9*a* and 9*b* protrude, and a printed circuit board 15 and a terminal housing 16 having power reception terminals 17*a*, 17*b*, 17*c*, and 17*d* to which a power-feeding connector is connected are mounted on the circuit-board mounting stand 14.

The circuit-board mounting stand 14 formed of an appropriate synthetic resin comprises bent walls 14*a*, 14*a* that engage both longitudinal ends of the first member 12 from the exterior in order to determine their mounting positions and bent portions 14*b*, 14*b* that engage a width-wise side edge of the first member 12 in order to determine its width-wise mounting position. In addition, the circuit board mounting stand 14 has notches 14*c* with which the positioning protrusions 5*a* and 3*a* at the upper ends of the coil assembly 2*a* and dummy member 3 are engaged; inflow holes 14*d*, 14*d* in communication with the inflow holes 12*c*, 12*c* in the top surface of the first member 12; tap holes 14*e*, 14*e* used to mount a cover 44; and a hook-like mounting portions 14*f* to which the terminal housing 16 is attached.

The printed circuit board 15 comprises a printed wiring that connects the coil terminals 9*a* and 9*b* to each of the power reception terminals 17*a* to 17*d* and on which Zener diodes 20, 20 are mounted as controlling electronic parts.

The terminal housing 16, which is molded of an insulating material, has engaging portions 16*a* that in turn engage the mounting portion 14*f* of the circuit board mounting stand 14 and that are used to mount the housing 16 on the circuit-board mounting stand 14 in the horizontal direction.

The L-shaped power reception terminals 17*a* to 17*d* each have one end protruding into a socket portion 16*b* of the terminal housing 16 and the other end protruding to the exterior from the upper end of the solenoid, with four integral rubber caps 10 fitted on the protrusions.

Figure 4:
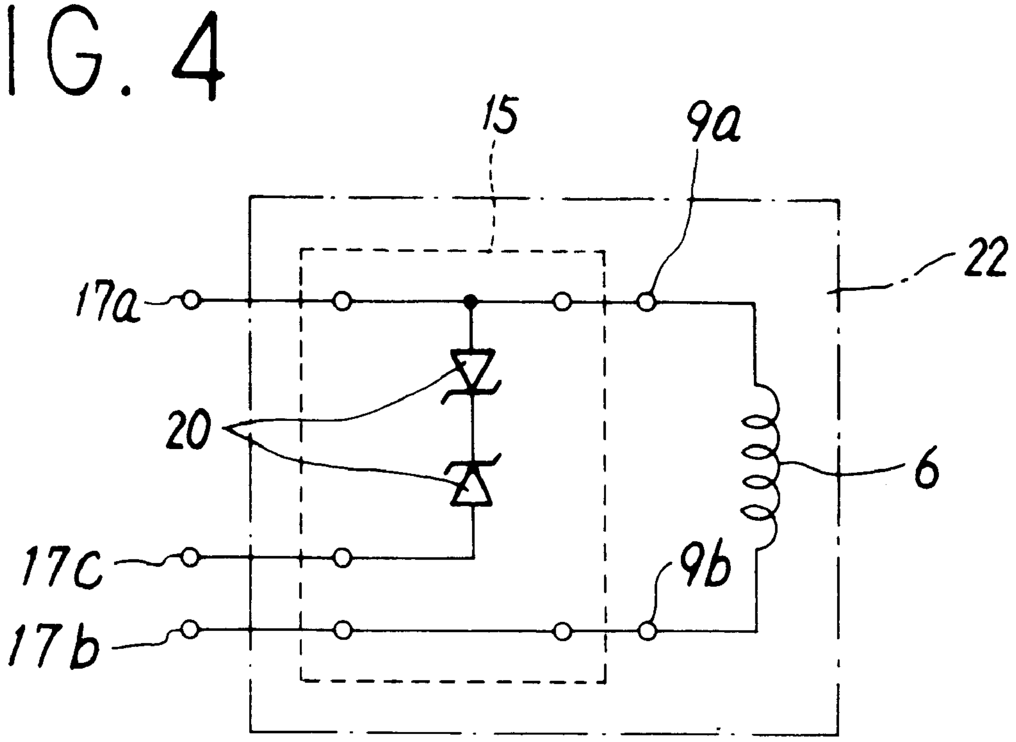
FIG. 4 is an electric circuit diagram of the solenoid in FIG. 1.

As shown in FIG. 4, the power reception terminals 17*a* and 17*b* are electrically connected with the coil terminals 9*a* and 9*b* via the printed circuit board 15, and the terminal 17*c* is connected to the Zener diodes 20, 20 mounted on the printed circuit board 15 and connected in series to the power reception terminal 17*a*. The remaining power reception terminal 17*d* is free because this is a single pilot embodiment.

According to the first embodiment, the coil assembly 2*a* and dummy member 3 are assembled in the magnetic frame 4 at mutually parallel positions by engaging the positioning protrusions 5*a* and 3*a* at the upper ends of the coil assembly and dummy member with the engaging portions 12*a* of the first member 12 in the magnetic frame 4 and engaging the positioning protrusions 5*b* and 3*b* at the lower end with the engaging portions 13*a* of the second member 13.

The engaging portions 16*a* are then engaged with the mounting portions 14*f* to assemble the terminal housing 16 onto the circuit board mounting stand 14, and the printed circuit board 15 is installed in the circuit board mounting stand 14 so as to electrically connect the terminals 17*a* to 17*d* to the printed wiring on the printed circuit board 15.

Then, the circuit-board mounting stand 14 into which these members are integrated is positioned using the bent walls 14*a*, 14*a* and bent portions 14*b*, 14*b* and is then assembled on the first member 12, and the coil terminals 9*a* and 9*b* are electrically connected to the printed wiring on the circuit board 15.

After assembly, these components are inserted into appropriate molds (not shown) to mold them integrally using the synthetic resin 22 in order to provide the solenoid 1A.

Since the circuit board mounting stand 14 and first member 12 are U-shaped (i.e., both width-wise sides are open) and the inflow holes 14*d* and 12*c* are provided in the circuit board mounting stand 14 and first member 12 so that they communicate mutually when the mounting stand and first member are assembled together, these components can be molded easily.

Figure 5:
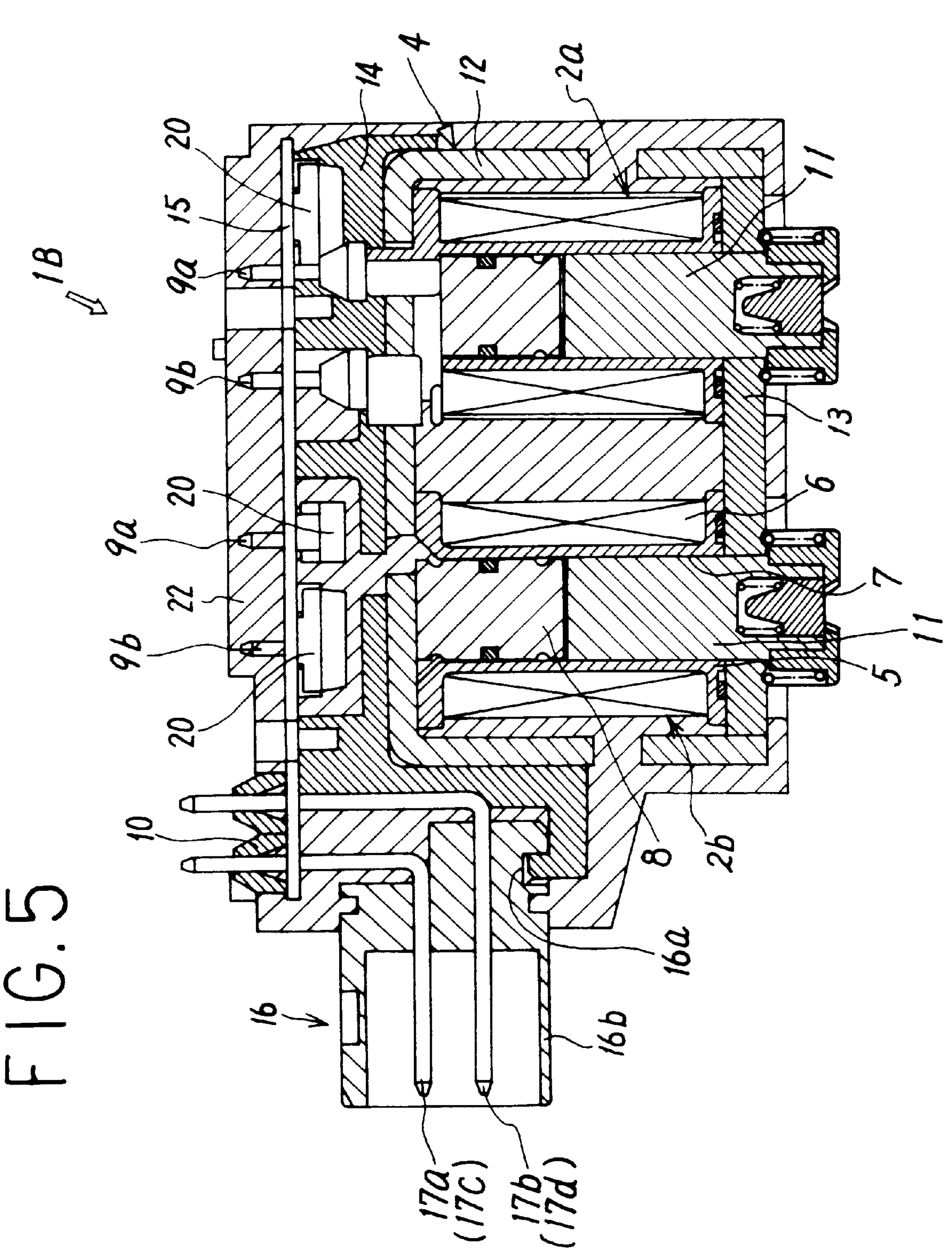
FIG. 5 is a cross sectional view showing a second embodiment of the solenoid according to this invention.
Figure 6:
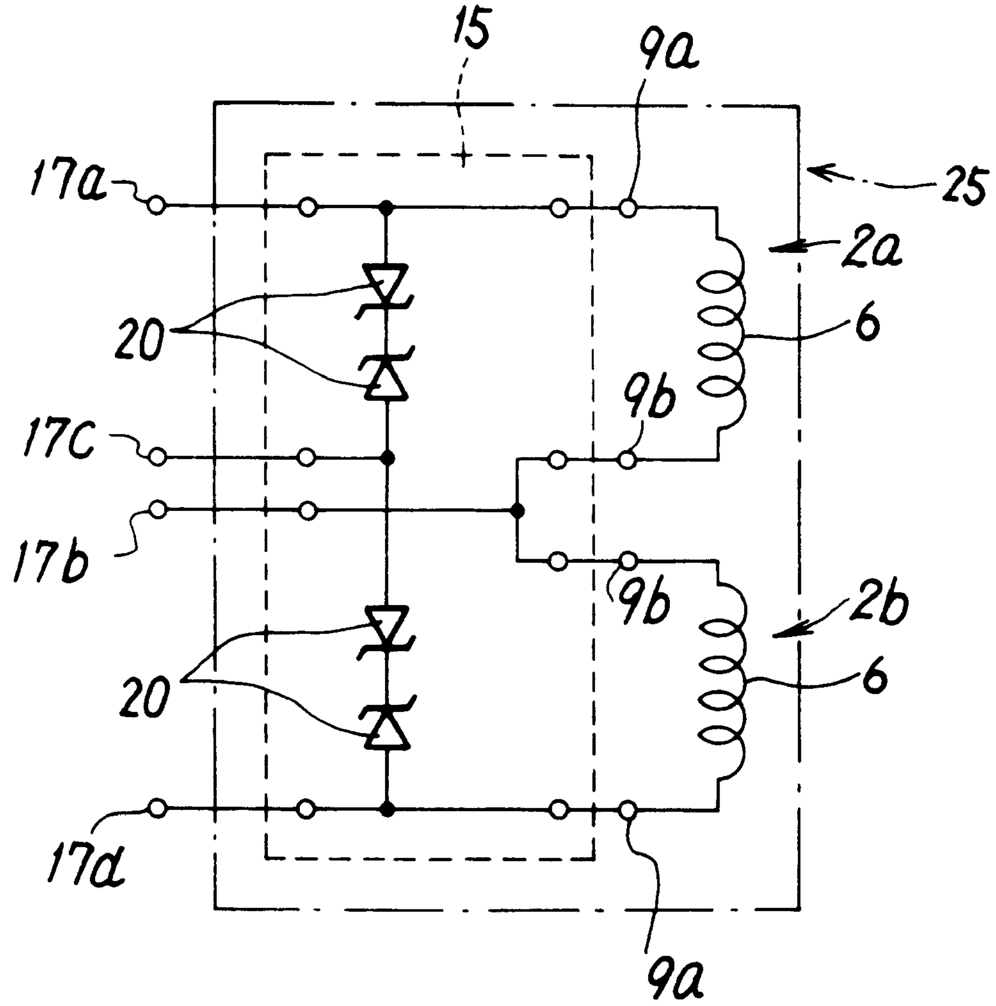
FIG. 6 is an electric circuit diagram of the solenoid in FIG. 5.

FIG. 5 shows a second embodiment of this invention. A solenoid 1B according to the second embodiment has a configuration that can be used for a double-pilot solenoid-operated vale and comprises two coil assemblies 2_a_ and 2_b_ assembled into the single magnetic frame 4 at mutually parallel positions. FIG. 6 is a circuit diagram of the solenoid 1B.

The second embodiment essentially has the same configuration as the first embodiment except that a coil assembly 2_b_ is integrated into the magnetic frame 4 instead of the dummy member 3 and except for the related additions and electric connections of electronic parts.

According to the second embodiment, the two coil terminals 9_a_ and 9_b_ of the first coil assembly 2_a_ are connected to the power reception terminals 17_a_ and 17_b_ via the printed circuit board 15, and the two coil terminals 9_a_ and 9_b_ of the second coil assembly 2_b_ are connected to the power reception terminals 17_d_ and 17_b_. Thus, the power reception terminal 17_b_ is connected to both coil terminals 9_b_, 9_b_ of the two coil assemblies 2_a_ and 2_b_. In addition, the printed circuit board 15 has two sets of Zener diodes 20, 20 for the two coil assemblies 2_a_ and 2_b_ that are connected between the power reception terminals 17_a_, 17_d_ and 17_c_.

As shown in each of the embodiments, in the double-pilot solenoid 1B, the single magnetic frame 4 functions not only as a magnetic path formation means common to the two coil assemblies 2_a_ and 2_b_ but also as a holder that holds the two coil assemblies 2_a_ and 2_b_ in such a way that they are coupled.

Thus, this configuration eliminates the need to provide an individual magnetic frame for each coil assembly and to provide a separate holder.

In addition, as in the solenoid 1A of a single-pilot type, the magnetic frame 4 functions not only as a magnetic path formation means for the coil assembly 2_a_ but also as a holder that holds the two coil assembly 2_a_ and dummy member 3.

By determining whether the two coil assemblies 2_a_ and 2_b_ or the coil assembly 2_a_ and dummy member 3 are integrated into the magnetic frame 4, a small number of common parts and molds can be used to form the single-pilot solenoid 1A and the double-pilot solenoid 1B simply and economically.

Furthermore, since all components including electric connections are sealed and integrated into the synthetic resin 22, this invention is easy to handle, is appropriately insulated, and is extremely safe.

Figure 7:
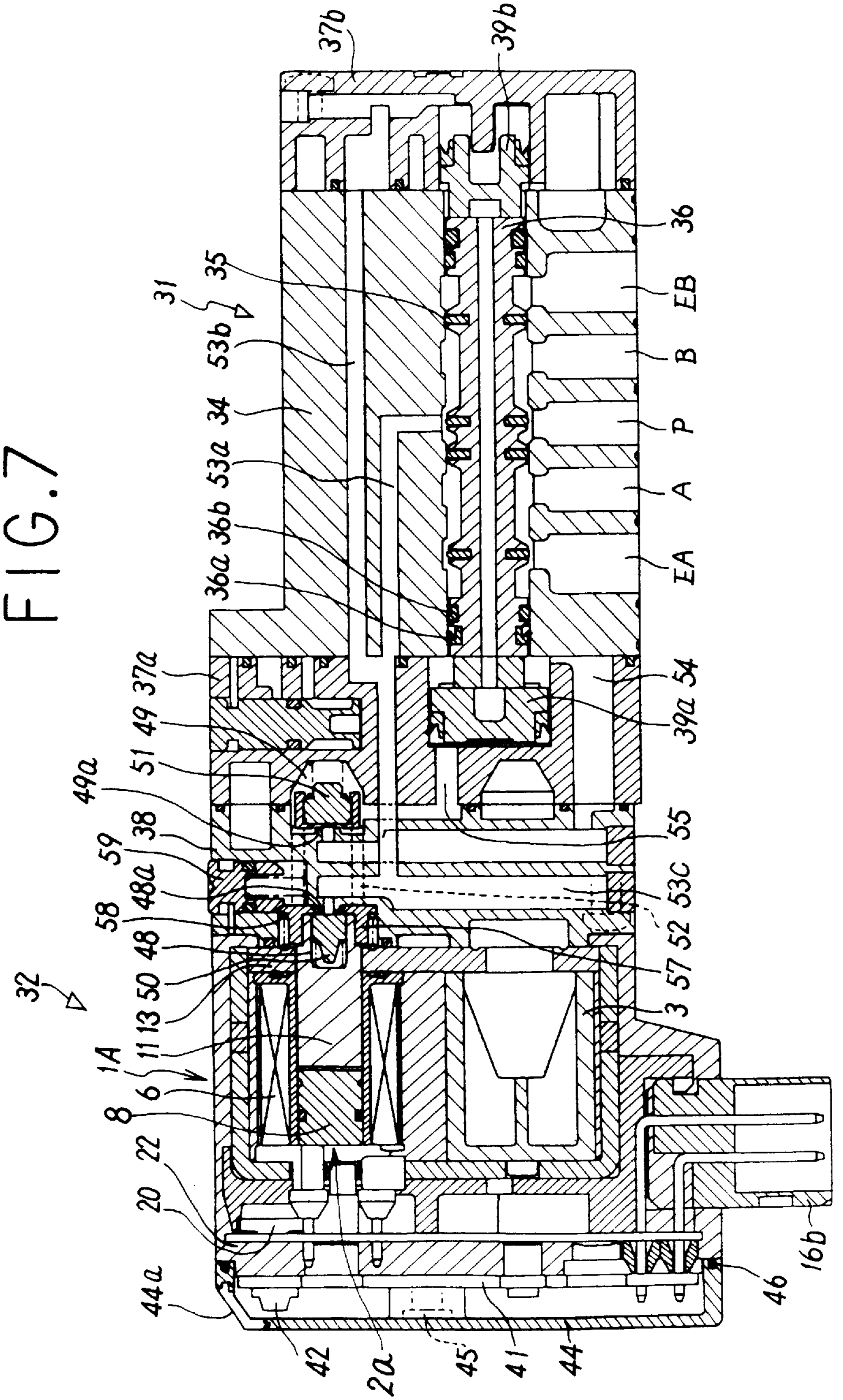
FIG. 7 is a cross sectional view of an example of the implementation of the solenoid according to the first embodiment.
Figure 8:
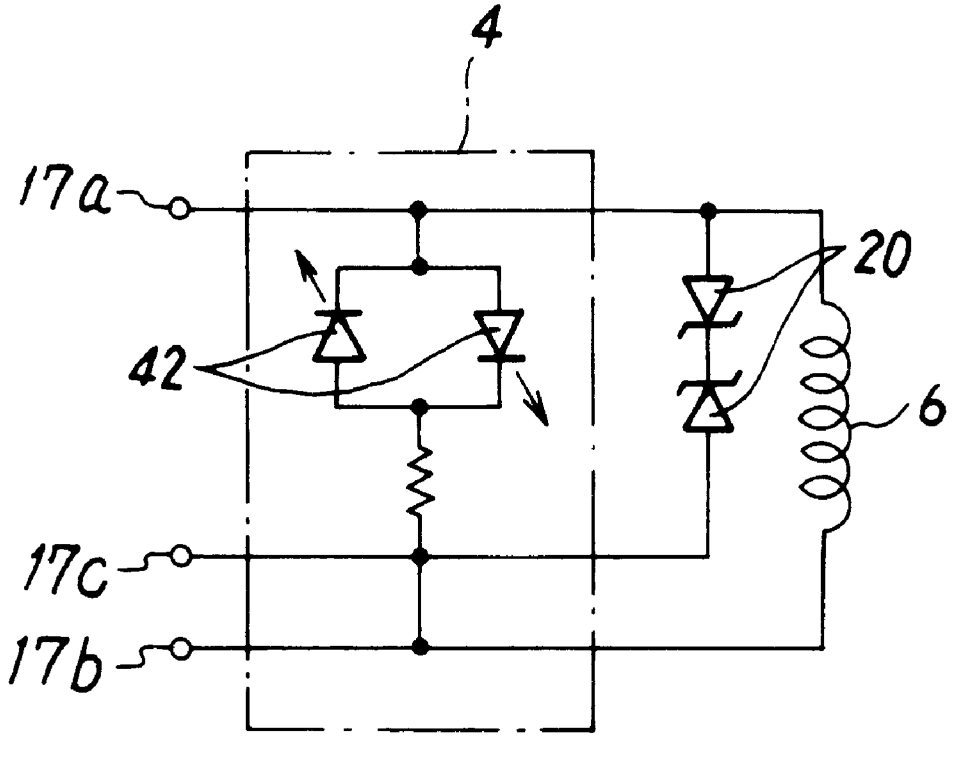
FIG. 8 is an electric circuit diagram of the solenoid in FIG. 7.

FIGS. 7 and 8 show a single-pilot solenoid-operated valve that uses a single pilot valve 32 having the solenoid 1A according to the first embodiment in order to operated a transfer valve 31.

A valve body 34 of the transfer valve 31 comprises a supply port P, output ports A and B, and ejection ports EA and EB all used for compressed air, and valve holes 35 into which these ports open. A valve disc 36 that switches the communication between the two output ports A, B and the supply port P and ejection ports EA, EB is slidably inserted into the valve hole 35 in a gas-tight manner.

A first plate 37_a_, a pilot valve body 38, and the solenoid 1A are mounted on one side of the valve body 34 while a second plate 37_b_ is mounted on the other side, in a gas-tight manner using an appropriate mounting means such as mounting screws.

A first piston 39_a_ of a large diameter is slidably inserted into a first piston chamber of a large diameter formed in the first plate 37_a_, while a second piston 39_b_ of a small diameter formed in the second plate 37_b_ is slidably inserted into a second piston chamber of a small diameter formed in the second plate 37_b_. The valve disc 36 is pressed by the pistons 39_a_ and 39_b_ to move back and forth in the figure.

A lamp circuit board 41 having a lamp 42 is mounted on the solenoid 1A using an approximate means such as screws. The lamp 42 is supplied with power from the terminals 17_a_ to 17_c_ and the printed wiring provided on the lamp circuit board 41 and electrically connected to the terminals, as shown in FIG. 8. A cover 44 that covers the lamp circuit board 41 includes a transparent or semi-transparent window 44_a_ that allows the lighting of the lamp 42, i.e., power supply to the coil 6 to be viewed externally and that is mounted on the solenoid 1A by screwing tap screws 45 into the tap holes 14_e_. A cover gasket 46 seals the cover 44 and solenoid 1A in a gas-tight manner.

A pilot supply valve chamber 48 is formed opposite to the movable iron core 11 in the pilot valve body 38 and a pilot output valve chamber 49 is formed on an extension from the pilot supply valve chamber 48. A pilot supply valve seat 48_a_ and a pilot ejection valve seat 49_a_ are formed in the valve chambers 48 and 49 on a back-to-back basis, and the valve chambers 48 and 49 are in communication with each other via a communication channel 52.

A holder 57 mounted at the tip of the movable iron core 11 prevents a pilot supply valve disc 50 that opens and closes the pilot supply valve seat 48_a_ from slipping out from the movable iron core. The pilot supply valve disc 50 and a pilot ejection valve disc 51 that opens and closes the pilot supply valve seat 49_a_ can be integrally moved by a connecting member (not shown) loosely inserted into the communication channel 52. In addition, the pilot supply valve disc 50 is urged in the direction in which the pilot supply valve seat 48_a_ is closed, by a return spring 58 on the movable iron core that is compressed between the second member 13 and the holder 57.

The supply port P in the main valve 31 is in communication with the pilot supply valve seat 48_a_ through a pilot supply channel 53_a_ and with the second piston chamber through a pilot supply channel 53_b_ that penetrates the valve body 34. Furthermore, the supply port P is opened at the bottom surface of the pilot valve body 38 through a pilot supply channel 53_c_.

On the other hand, the pilot ejection valve seat 49_a_ is opened at the bottom surface of the pilot valve body 38 through a pilot ejection channel 54 and is in communication with the ejection port EA via the valve hole 35 and the gap between a check seal 36_a_ and a wear ring 36_b_ fitted in the valve disc 36. The check seal 36_a_ allows a pilot fluid to be ejected only if the ejection air pressure of the fluid exceeds the air pressure in the ejection port EA and otherwise shuts off the communication to the ejection port EA. In addition, the pilot output valve chamber 49 is in communication with the first piston chamber through a pilot output channel 55.

In the example presented in FIG, the openings in the bottom surface of the pilot valve body 38 extending from the pilot supply channel 53_c_ and pilot ejection channel 54 are each closed by a plug.

In FIG. 7, reference numeral 59 designates a manual operation portion that is pressed to moved the pilot valve disc 50 in order to open the pilot supply valve seat 48_a_.

In the transfer valve 30, when power is supplied through the coil 6 in the solenoid 1A, the fixed iron core 8 attracts the movable iron core 11 to cause the pilot supply valve body 50 to open the pilot supply valve seat 48_a_ while causing the pilot ejection valve disc 51 to close the pilot ejection valve seat 49_a_. Thus, a pilot fluid supplied from the supply port P in the main valve 31 is supplied to the first piston chamber through the pilot supply valve chamber 48, communication channel 52, pilot output valve chamber 49, and pilot output channel 55. Consequently, the difference in diameter between the first piston 39*a* and the second piston 39*b* causes the pistons 39*a* and 39*b* and valve disc 36 to be moved rightward in the figure, thereby allowing the supply port P and output port A to communicate with each other while allowing the output port B and ejection port EB to communicate with each other.

When the power to the coil 6 is turned off, the pilot supply valve disc 50 closes the pilot supply valve seat 48*a* whereas the pilot ejection valve disc 51 opens the pilot ejection valve seat 49*a*, causing the pilot fluid in the first piston chamber to be ejected to the exterior through the pilot output channel 55, pilot ejection valve seat 49*a*, and pilot ejection channel 54. Thus, force applied by the pilot fluid pressure supplied to the second piston chamber causes the pistons 39*a* and 39*b* and valve disc 36 to be moved leftward in the figure, thereby allowing the supply port P and output port B to communicate with each other while allowing the output port A and ejection port EA to communicate with each other.

Although not specifically shown, a pilot valve 32 in which the solenoid 1B according to the second embodiment is mounted in the pilot valve body 38 into which the two sets of pilot valve mechanisms are integrated can be mounted on the transfer valve 31 in order to obtain a double-pilot solenoid-operated valve.

What is claimed is:

1. A solenoid for a solenoid-operated valve comprising:

at least one coil assembly having a coil wound around a bobbin, fixed and movable iron cores provided in a center hole of said bobbin, and a pair of pin-like coil terminals protruding from an end surface of said bobbin;

a single magnetic frame sized so as to accommodate two coil assemblies simultaneously, wherein at least one coil assembly is integrated into said magnetic frame;

a circuit-board mounting stand of a synthetic resin disposed on the end surface of said magnetic frame from which the coil terminals protrude;

a printed-circuit board electrically in communication with said coil terminals and mounted on said mounting stand;

a terminal housing also mounted on said mounting stand and having a socket portion and a plurality of L shaped power reception terminals first ends of which are located within said socket portion to which a power-feeding connector is connected, and second ends of which extend to a different area of said solenoid than said terminal area;

wherein the coil terminals are connected to the power-receiving terminals via said printed circuit board, and wherein the circuit-board, mounting stand, terminal housing, magnetic frame and coil assembly are sealed and integrated into a synthetic resin and said second ends of said power reception terminals protrude from said synthetic resin in said different area of the solenoid such that a lamp circuit board is connectable to said second ends.

2. A solenoid according to claim 1, wherein two coil assemblies are accommodated in said magnetic frame.

3. A solenoid according to claims 1, wherein a single coil assembly and a dummy member having essentially the same external shape and size as the coil assembly are integrated into said magnetic frame.

4. A solenoid according to claim 2 wherein said magnetic frame consists of a first U-shaped member and a second member that connects both ends of the first member together and wherein a plurality of positioning protrusions formed at the vertical ends of each coil assembly are engaged with a plurality of engaging portions formed in the first and second members to integrate the two coil assemblies into the magnetic frame.

5. A solenoid according to claim 3 wherein said magnetic frame consists of a first U-shaped member and a second member that connects both ends of the first member together and wherein a plurality of positioning protrusions formed at the vertical ends of the coil assembly and dummy member are engaged with a plurality of engaging portions formed in the first and second members to integrate the coil assembly and dummy member into the magnetic frame.

* * * * *